United States Patent
Wirkus

(10) Patent No.: US 11,596,135 B2
(45) Date of Patent: Mar. 7, 2023

(54) ICE FISHING HOLE COVER

(71) Applicant: Robert Wirkus, Summerset, SD (US)

(72) Inventor: Robert Wirkus, Summerset, SD (US)

( * ) Notice: Subject to any disclaimer, the term of this patent is extended or adjusted under 35 U.S.C. 154(b) by 0 days.

(21) Appl. No.: 17/352,462

(22) Filed: Jun. 21, 2021

(65) Prior Publication Data
US 2021/0400940 A1 Dec. 30, 2021

Related U.S. Application Data

(60) Provisional application No. 63/043,682, filed on Jun. 24, 2020.

(51) Int. Cl.
*A01K 97/01* (2006.01)

(52) U.S. Cl.
CPC .................... *A01K 97/01* (2013.01)

(58) Field of Classification Search
CPC ........ A01K 97/00; A01K 97/01; B65D 51/18; B65D 51/04; B65D 51/10; B65D 55/00; B65D 2251/0021; B65D 2251/0081; B65D 2251/0009
USPC .............................................. 220/254.3; 43/4
See application file for complete search history.

(56) References Cited

U.S. PATENT DOCUMENTS

| | | | | |
|---|---|---|---|---|
| 3,466,781 A * | 9/1969 | Frank | ...................... | A01K 97/01 43/4 |
| 3,578,748 A * | 5/1971 | Hurd | ...................... | A01K 97/01 43/17 |
| 4,131,107 A * | 12/1978 | Godbout | ................ | A01K 97/01 126/271.2 R |
| 4,980,986 A * | 1/1991 | Harper | .................... | A01K 97/01 43/17 |
| 4,993,182 A * | 2/1991 | Monsen | ................ | A01K 97/01 43/17 |
| 5,956,882 A * | 9/1999 | Deimel | .................. | A01K 97/01 43/4.5 |
| 6,675,523 B1* | 1/2004 | Huiras | .................... | A01K 97/01 43/4 |
| 2001/0045047 A1* | 11/2001 | Smolinski | .............. | A01K 97/01 43/5 |
| 2004/0195238 A1* | 10/2004 | Brija | ....................... | A47J 36/06 220/912 |
| 2012/0246994 A1* | 10/2012 | Katz | ....................... | A01K 97/01 43/4 |
| 2015/0342168 A1* | 12/2015 | Helms | .................... | A01K 97/01 43/54.1 |
| 2020/0163320 A1* | 5/2020 | Tibbetts | ................. | A01K 97/01 |
| 2020/0253182 A1* | 8/2020 | Lindgren | ............... | A01K 97/01 |
| 2021/0120797 A1* | 4/2021 | Aleksandr | ............. | A01K 97/01 |

* cited by examiner

*Primary Examiner* — Timothy D Collins
*Assistant Examiner* — Maria E Graber
(74) *Attorney, Agent, or Firm* — Brennan, Manna & Diamond, LLC

(57) ABSTRACT

This present invention relates to an ice fishing hole cover. The cover features a hinged door attached to the cover through mechanical attachments. The ice fishing hole cover includes a fishing line hole to allow a user to setup a fishing bait line through the cover. The hinged door enables the user to open a portion of the cover, and not the entire cover, to set up the fishing bait line or to access and land a fish caught while ice fishing. The ice fishing hole cover enhances the overall ice fishing experience of the users and eliminates the inconvenience of maintaining an open ice hole while fishing.

8 Claims, 2 Drawing Sheets

ICE FISHING HOLE COVER

CROSS-REFERENCE TO RELATED APPLICATION

The present application claims priority to, and the benefit of, U.S. Provisional Application No. 63/043,682, which was filed on Jun. 24, 2020 and is incorporated herein by reference in its entirety.

FIELD OF THE INVENTION

The present invention relates generally to the field of ice fishing hole covers. More specifically, the present invention relates to a magnetic ice fishing hole cover comprising a small hinged door attached to the remaining ice fishing hole cover through, for example, magnetic attachments, wherein the hinged door allows a user to access part of an ice fishing hole without removing the cover in its entirety. The magnetic ice fishing hole cover can be easily set up over an ice fishing hole to prevent snow, ice, etc. from freezing over the ice fishing hole. The magnetic ice fishing hole cover improves the overall ice fishing experience and ensures the users enjoy their time while ice fishing. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, ice fishing sport is popular in northern Europe, North America, and other regions that have seasonal frigid temperatures. Ice fishing is a practice which involves catching fish with fishing lines and hooks or spears, through an opening in the ice on a frozen body of water. Ice fishing can be enjoyed individually or in groups. Usually, a person digs a hole through the frozen water surface over a designated fishing spot, until the underwater is visible, and then sets up a line to catch fish. However, after digging the initial hole, a layer of snow or ice frequently forms over the fishing hole, which blocks the access underwater to perform ice fishing.

Ice fishers and others have been using various solutions to keep ice fishing holes from constantly freezing over. One of the easiest solutions is through the use of a plastic or steel scooper for scooping out the newly formed ice from the hole when the water starts freezing. However, it only works when the ice cover is still forming or a mushy ice layer is formed. Additionally, the individuals have to constantly check the hole and be close to the fishing hole, to prevent the hole from freezing completely. In situations where the hole freezes completely, it can become extremely difficult to scoop out the ice from the frozen hole.

Some ice fishers choose to carry a heater, which not only provides warmth during colder periods, but also keeps the fishing hole from freezing. Additionally, individuals may use the heater to boil lake water or shaved ice, and then pour the boiled water over the fishing holes frequently, to prevent the holes from freezing. However, the complete process of collecting lake water or shaved ice, heating it, and pouring the boiled water over the fishing holes is a tiresome process, causing individuals to get easily frustrated.

Devices such as ice fishing hole covers are also available in the market and can be set up over an ice fishing hole to prevent ice holes from freezing over again and again. A fishing line can be set through a central hole of the ice fishing hole cover to perform ice fishing. These ice hole covers provide insulation to the hole therebelow and prevent its exposure to the freezing environment, and in this manner prevent the ice holes from freezing over. However, when a fish is caught and is to be taken out, the complete ice fishing hole cover needs to be taken out, and then set up again. This can be a frustrating job, particularly when the user needs to frequently repeat the aforementioned process to access the caught fish.

Therefore, there exists a long felt need in the art for an ice fishing hole cover that prevents the ice fishing hole from freezing over, and that does not require an individual to constantly monitor the ice fishing hole to scoop out the mushy ice layer over it. Additionally, there is a long felt need in the art for an ice fishing hole cover that eliminates the need to carry heaters to boil lake water and pour it over the ice hole to prevent the same from freezing, and that minimizes the individual's exposure to the environment and allows the individual to fish hassle-free. Furthermore, there is a long felt need in the art for an ice fishing hole cover that does not require the individual to completely remove the cover to access any fish caught therethrough, and that eliminates the need to constantly drill out new holes in the ice to catch fish. Finally, there is a long felt need in the art for an ice fishing hole cover that is relatively inexpensive to manufacture and that is both safe and easy to use.

The subject matter disclosed and claimed herein, in one embodiment thereof, comprises a magnetic ice fishing hole cover for effectively protecting an ice fishing hole from freezing. The magnetic ice fishing hole cover covers the ice hole while fishing. The magnetic ice fishing hole cover further comprises: a generally circular cover made of polycarbonate or similar plastic having a top surface, a bottom surface, a magnetic hinged door; a central circular fishing hole to receive a fishing line therethrough; the magnetic hinged door is configured as a cut-out in the cover body and is hinged along an edge on the cover and includes a magnetic edge which is attached longitudinally to a magnetic attachment; the magnetic attachment is permanently fastened to the cover; and, the door swings along the hinged edge in an upward direction to create an opening to access the central circular fishing hole. The cover provides insulation and protects the ice fishing hole from freezing.

In this manner, the novel magnetic ice fishing hole cover of the present invention accomplishes all of the forgoing objectives and provides a relatively efficient and convenient solution to keep the ice fishing holes from freezing in a frigid environment. The magnetic ice fishing hole cover of the present invention comprises a hinged cover portion which allows the user to open a part of the cover and does not require the removal of the complete ice hole cover set up, in order to access fish caught while ice fishing. Additionally, the magnetic ice fishing hole cover is user-friendly, as it eliminates the need to constantly monitor the holes to scoop out newly formed ice layers or constantly drill out new holes in the ice to continue fishing.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a magnetic ice fishing hole cover for effectively protecting an ice fishing hole from freezing. The magnetic ice fishing hole cover covers the ice hole while fishing. The magnetic ice fishing hole cover further comprises: a generally circular cover made of polycarbonate or similar plastic having a top surface, a bottom surface, a magnetic hinged door; a central circular fishing hole to receive a fishing line therethrough; the magnetic hinged door is configured as a cut-out in the cover body and is hinged along an edge on the cover and includes a magnetic edge which is attached longitudinally to a magnetic attachment; the magnetic attachment is permanently fastened to the cover; and, the door swings along the hinged edge in an upward direction to create an opening to access the central circular fishing hole. The cover provides insulation and protects the ice fishing hole from freezing.

In a further embodiment of the present invention, a circular protective cover for covering ice fishing holes is disclosed. The cover includes a round plastic cover featuring a hinged door that allows a user to access part of a central circular fishing hole without removing the cover from the ice fishing hole in its entirety. The hinged door is a swinging door conforming to the shape of the cover and swings along a hinged edge on the top surface of the cover and is prevented to move beyond the cover in a downward direction using a magnetic attachment. The cover is made up of plastic such as polycarbonate and includes insulation to prohibit freezing over of a drilled ice fishing hole.

In a further embodiment of the present invention, the ice fishing hole cover can be utilized with a variety of fishing hole sizes. The cover is insulating, corrosion free and durable. The cover acts as a barrier between the external ambient air and the ice fishing hole, thereby effectively protecting the ice fishing hole from freezing over. The cover improves the overall fishing experience and eliminates the need to drill new ice fishing holes.

In a yet still further embodiment, an ice fishing hole cover is presented, wherein the cover is a one-piece cover body having a top surface, a bottom surface, a hinged door forming a portion of the cover body, a fishing line access having a circular configuration to receive a fishing line therethrough, the hinged door extending from the fishing line access to the periphery of the cover forming up to 30% of the cover portion (in one potential embodiment), and the hinged door is configured to swing along an hinged edge, and forms the portion of the cover using a magnetic edge attached to a magnetic attachment. The hinged door when swung open provides an opening allowing access to the fishing line and access for the effective removal of caught fish.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
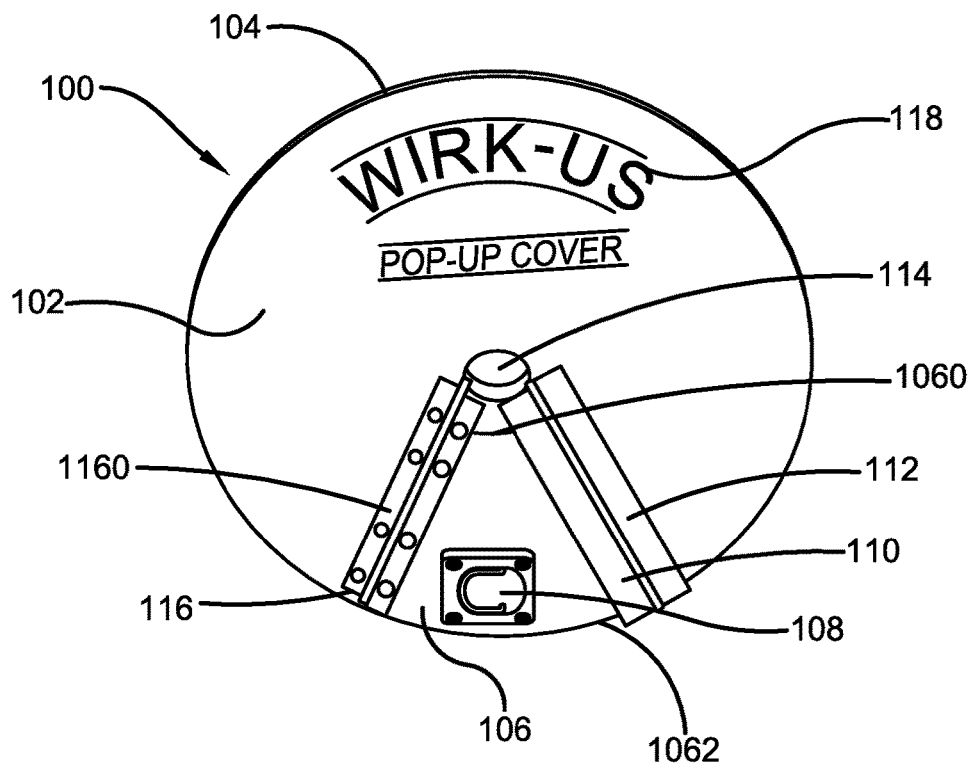
FIG. 1 illustrates a perspective view of one potential embodiment of a magnetic ice fishing hole cover of the present invention in accordance with the disclosed architecture, wherein the hole cover's hinged door is in the closed position.

The innovation is now described with reference to the drawings, wherein like reference numerals are used to refer to like elements throughout. In the following description, for purposes of explanation, numerous specific details are set forth in order to provide a thorough understanding thereof. It can be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments can be combined.

As noted above, there is a long felt need in the art for an ice fishing hole cover that prevents the ice fishing hole from freezing over, and that does not require an individual to constantly monitor the ice fishing hole to scoop out the mushy ice layer that forms over it. Additionally, there is a long felt need in the art for an ice fishing hole cover that eliminates the need to carry heaters to boil lake water and pour it over the ice hole to prevent the same from freezing, and that minimizes the individual's exposure to the environment and allows the individual to fish hassle-free. Furthermore, there is a long felt need in the art for an ice fishing hole cover that does not require the individual to completely remove the cover to access any fish caught therethrough, and that eliminates the need to constantly drill out new holes in the ice to catch fish. Finally, there is a long felt need in the art for an ice fishing hole cover that is relatively inexpensive to manufacture and that is both safe and easy to use.

The present invention, in one exemplary embodiment, is a novel magnetic ice fishing hole cover for effectively protecting an ice fishing hole from freezing. The magnetic ice fishing hole cover covers the ice hole while ice fishing. The magnetic ice fishing hole cover further comprises: a generally circular cover made of polycarbonate or similar plastic having a top surface, a bottom surface, a magnetic hinged door, and a central circular fishing hole to receive a fishing line therethrough; the magnetic hinged door is configured as a cut-out in the cover body and is hinged along an edge on the cover and includes a magnetic edge which is attached longitudinally to a magnetic attachment; the magnetic attachment is fastened to the cover; and, the door swings along the hinged edge in an upward direction to create an opening to access the central circular fishing hole. The cover includes an insulated bottom layer to provide insulation and protection from ice formation at the ice fishing hole.

Referring initially to the drawings, FIG. 1 illustrates a perspective view of one potential embodiment of a magnetic ice fishing hole cover 100 of the present invention in accordance with the disclosed architecture, wherein the hole cover's hinged door is in the closed position. The magnetic ice fishing hole cover 100 is a generally circular cover configured and dimensioned to completely cover a conventional ice fishing hole. The magnetic ice fishing hole cover 100 includes a top surface 102 and an insulated bottom surface 104. The cover 100 is placed over an ice fishing hole with the insulated 124 bottom surface 104 circumscribing and overlapping a portion of ice around the ice fishing hole to prohibit the ice fishing hole from snow and ice causing the ice fishing hole to freeze over.

The cover 100 includes a circular fishing line hole 114 allowing a user to fish through the circular fishing line hole 114. The user is able to fish in the ice fishing hole even when the cover 100 covers the ice fishing hole. The circular fishing line hole 114 having a circular configuration includes a size sufficient for a user to extend a finger through the hole 114 to remove the cover 100 from the ice fishing hole. Also, the hole 114 allows a fishing bait line to easily extend through it for an easy fishing process for the user.

To access the hole 114 for receiving the fishing bait line, the cover 100 includes a magnetic hinged door 106 having a hinged handle 108 for grasping in order to actuate the door 106. The door 106 can be a hinged door, having hinges 116 screwed with mechanical fasteners 1160. The door 106 can be swingable along the hinged edge 116. The top edge 1060 of the door 106 is configured and shaped to align with the circular shape of the hole 114, and the bottom edge 1062 of the door 106 is configured and shaped in the form of an arc to conform to the circular periphery of the cover 100. The door 106 includes a magnetic edge 110 which is selectively retained to a magnetic attachment 112 fastened on the cover 100.

To access the fishing line hole 114 for the fishing bait line, the hinged door 106 can be pulled by a user via the hinged handle or clip 108. Pulling the handle 108 upward overcomes the magnetic force, allows the magnetic edge 110 to be detached from the magnetic attachment 112, and allows the door 106 to swing in an upward direction (away from the ice fishing hole) along the hinge 116 to create an open space for a fishing bait line. Once the fishing bait line is received by the hole 114, the door 106 can be swung back to attract (attach) the magnetic edge 110 to the magnetic attachment 112. Similarly, when a fish is hooked to the fishing line, the door 106 can be opened to pull the fish from a water opening 202 and land the fish without requiring the cover 100 to be removed from over the ice fishing hole.

The process of fishing, accessing the bait line, and opening or closing of the door 106 can be performed without removing the cover 100 from the ice fishing hole. In the preferred embodiment, the cover 100 is made up of polycarbonate and ensures that the ice fishing hole does not freeze over or let in snow. The hinges 116 can be spring-loaded hinges allowing the door 106 to swing freely. The magnetic attachment 112 abuts the magnetic edge 110, thereby preventing the door 106 to move in a downward direction beyond the top surface 102 of the cover 100. The ice fishing hole cover 100 can include certain design indicia 118 or markings that allow identification of the cover 100. The design indicia 118 could be a company logo or brand, or even a user's name, or any form of advertising or marketing. The options for design indicia 118 are essentially limitless.

The cover 100 also prevents a user's items, such as a smartphone, glasses, or any other personal items, from falling while fishing. In one embodiment, the diameter of the hole 114 is less than 2.5 inches to prevent cell phones from passing therethrough. In another embodiment, the cover 100 can have a circumferential sloping taper or slant towards the circular periphery of the cover 100 (i.e. slope away from hole 114) to form a generally concave shape of the cover 100. The cover 100 can come in a variety of different colors and may include solar-powered illumination lights for viewing purposes. The cover 100 includes an insulated layer 124, which is coextensive with the bottom surface 104.

Figure 2:
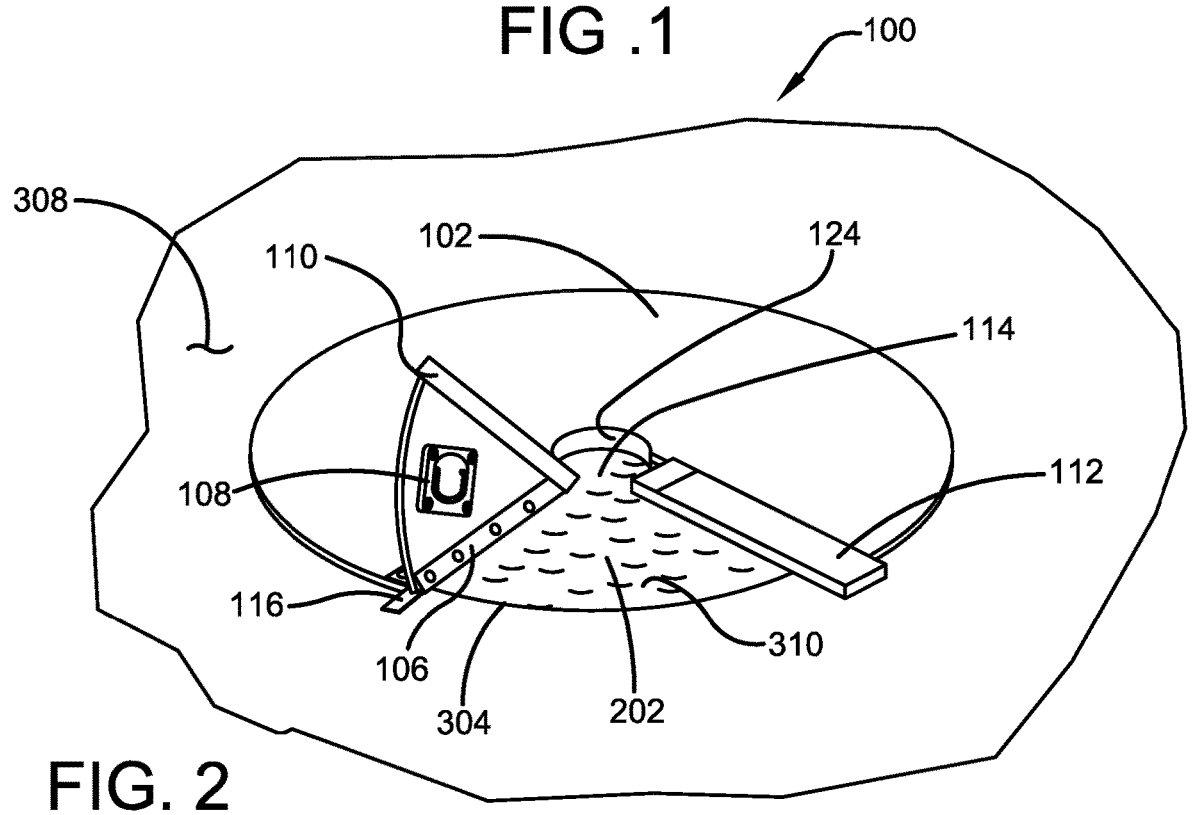
FIG. 2 illustrates a perspective view of one potential embodiment of a magnetic ice fishing hole cover of the present invention in accordance with the disclosed architecture, wherein the hole cover's hinged door is in the open position and the cover is positioned over a body of water.

FIG. 2 illustrates a perspective view of one potential embodiment of a magnetic ice fishing hole cover 100 of the present invention in accordance with the disclosed architecture, wherein the hole cover's hinged door is in the open position and the cover is positioned over a body of water. More specifically, to use a fishing bait line for fishing or to grab a caught fish, the magnetic hinged door 106 is pulled slightly by a user using the hinged handle 108 which swings the door 106 along the hinged edge 116 such that the magnetic edge 110 detaches from the magnetic attachment 112 to allow access to the opening 202, and access to the fishing line hole 114.

The opening 202 provides an area to access the fishing line hole 114 while the cover still covers the ice fishing hole. In conventional ice fishing hole covers, the entire cover needs to be removed to access the caught fish or the fishing line in the hole. The cover 100 is preferably comprised of a non-corrosive material, such as but not limited to plastic. The cover 100 of the present embodiment includes a circular shape, however various other shapes may be utilized to construct the cover 100 in order to cover the ice fishing hole.

Figure 3:
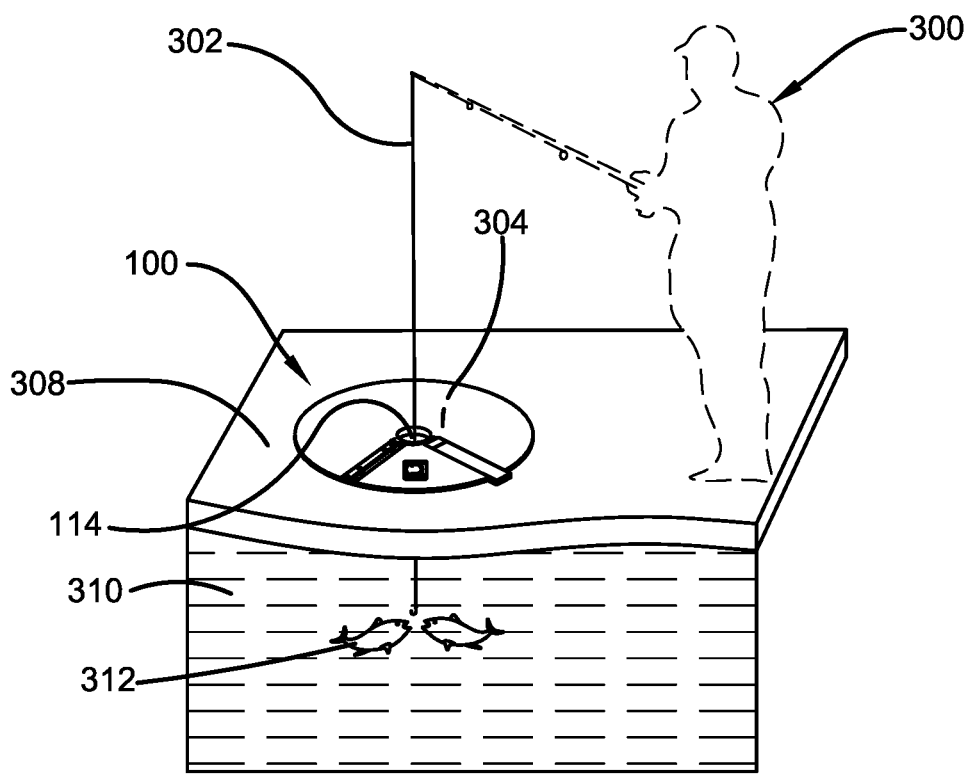
FIG. 3 illustrates a perspective view of one potential embodiment of a magnetic ice fishing hole cover of the present invention in accordance with the disclosed architecture, wherein an individual is fishing through the opening in the hole cover.

FIG. 3 illustrates a perspective view of one potential embodiment of a magnetic ice fishing hole cover 100 of the present invention in accordance with the disclosed architecture, wherein an individual is fishing through the opening in the hole cover 100. More specifically, an ice fishing hole 304 on the snow surface 308 is covered by the magnetic ice fishing hole cover 100 of the present invention. The cover 100 covers the hole 304 completely, and provides an insulating layer to the ice fishing hole 304 from the outer frigid environment. In this way, the cover 100 does not allow the hole 304 to freeze over.

As shown, a user 300 uses the fishing line 302 passing through the fishing line hole 114 to catch fish 312 in the water 310. The cover 100 can be of multiple colors and can come in various sizes to accommodate ice fishing holes 304 of various sizes. The cover 100 can be used for new or existing ice fishing holes. The cover 100 also provides a professional look to the fishing holes and protects them from freezing.

Figure 4:
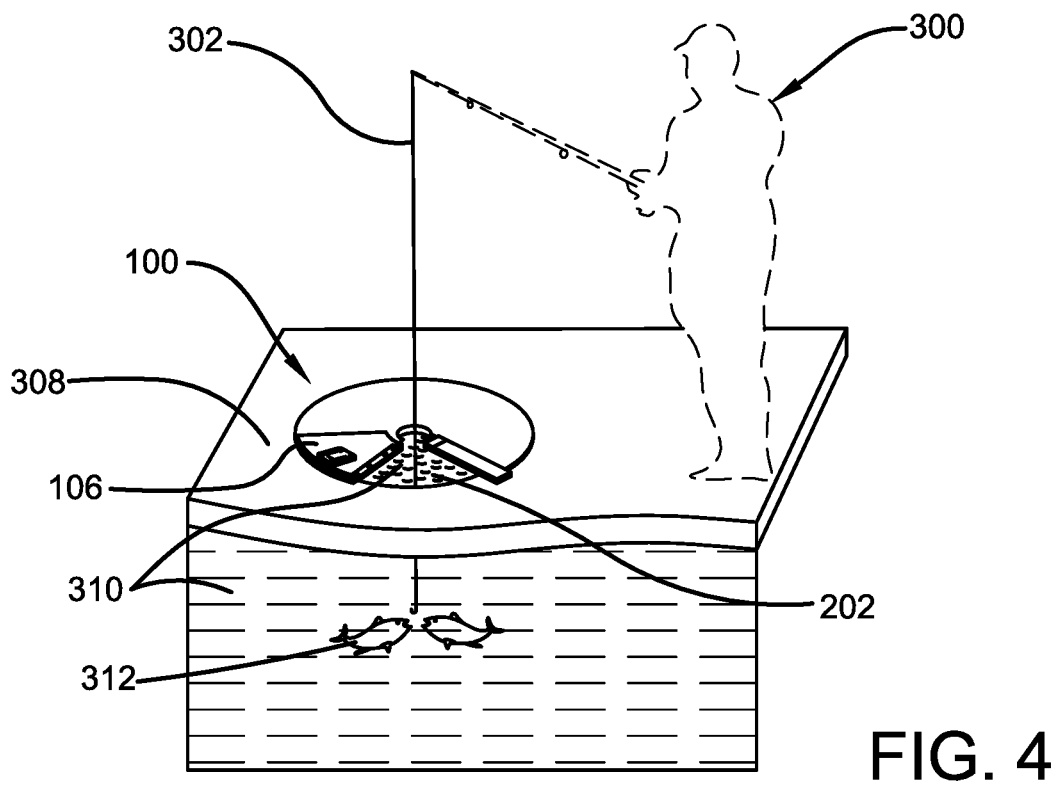
FIG. 4 illustrates a perspective view of another potential embodiment of a magnetic ice fishing hole cover of the present invention in accordance with the disclosed architecture, wherein an individual is fishing through the opening in the hole cover.

FIG. 4 illustrates a perspective view of another potential embodiment of a magnetic ice fishing hole cover 100 of the present invention in accordance with the disclosed architecture, wherein an individual is fishing through the opening in the hole cover 100. In the present embodiment, the fishing bait line 302 catches a fish 312 present in the water 310 under the ice fishing hole 304. To grab and land the caught fish 312, the magnetic hinged door 106 is opened and swung upward to allow access to the opening 202 for removing the fishing bait line 302 and fish 312. The cover 100 can still cover the ice fishing hole 304 to protect the ice fishing hole from freezing. It is to be appreciated that the cover 100 allows users to easily set up the cover 100 along with the magnetically-attached hinged door, and ensures the user can retain access to the fishing hole 304 via the hinged door 106. The polycarbonate construction of the cover 100 ensures that the hole 304 does not freeze up or let in snow.

The cover 100 of the present invention effectively maintains a continuous thermal covering over the ice fishing hole. The hinged door 106 can be of a bright fluorescence orange color or any other color that provides a highly visible surface during the day and night fishing hours. The outer surface of the cover unit 100 can be coated with a suitable black coating to absorb radiant solar energy, and thereby increase the temperature of the environment within the cover unit 100. The hinged door maintains a maximum effective closure over the fishing hole to minimize the exposure of water to the surrounding ambient air. The present invention provides a low-cost, highly visible ice fishing hole cover that provides improved functionality over the typical prior art devices, while providing an effective cover which prevents the ice fishing hole from freezing over.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "magnetic ice fishing hole cover", "ice fishing hole cover", "fishing hole cover" and "cover" are interchangeable and refer to the magnetic ice fishing hole cover 100 of the present invention.

Notwithstanding the forgoing, the magnetic ice fishing hole cover 100 of the present invention can be of any suitable size and configuration as is known in the art without affecting the overall concept of the invention, provided that it accomplishes the above-stated objectives. One of ordinary skill in the art will appreciate that the size, configuration and material of the magnetic ice fishing hole cover 100 as shown in the FIGS. are for illustrative purposes only, and that many other sizes and shapes of the magnetic ice fishing hole cover 100 are well within the scope of the present disclosure. Although the dimensions of the magnetic ice fishing hole cover 100 are important design parameters for user convenience, the magnetic ice fishing hole cover 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What includes been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An ice fishing hole cover for retaining access to an open water therebelow, the ice fishing hole cover comprising:
    a circular cover housing with a generally central opening for continual fishing access to the open water therebelow; and
    a hinged door selectively retained for opening a portion of said cover housing, the hinged door comprising a first edge extending from the generally central opening to a periphery of the circular cover housing and a second edge extending from the generally central opening to a periphery of the circular cover housing configured in a sector shape that is 30% or less of the area of the ice fishing hole cover; and
    said cover housing includes a black exterior coating for absorbing radiant solar energy and increasing the temperature of said cover housing in sunlight; and
    wherein the hinged door is openable to remove a fish from the open water without removing the circular cover housing.

2. The ice fishing hole cover of claim 1, wherein said hinged door selectively retained to said cover housing with a magnet.

3. The ice fishing hole cover of claim 2, wherein said central opening including a diameter, and further wherein said diameter is less than 2.5 inches for prohibiting items to pass therethrough.

4. The ice fishing hole cover of claim 3, wherein said cover housing includes a circumferential sloping taper away from said central opening for directing dropped items on said cover housing away from said central opening.

5. The ice fishing hole cover of claim 4, wherein said hinged door includes a hinged handle for selective grasping and opening of said hinged door.

6. An ice fishing hole cover for retaining access to an open water therebelow, the ice fishing hole cover comprising:
    a circular cover housing comprising a central opening for continual fishing access to the water therebelow and a circumferential sloping taper away from said central opening for directing dropped items on said cover housing away from said central opening; and
    a hinged door selectively retained for opening a portion of said cover housing, the hinged door comprising a first edge extending from the generally central opening to a periphery of the circular cover housing and a second edge extending from the generally central opening to a periphery of the circular cover housing configured in a sector shape that is 30% or less of the area of the ice fishing hole cover;
    said hinged door further comprising a hinged handle for selective grasping and opening of said hinged door;
    said hinged door selectively retained to said cover housing with a magnet attached to the second edge of the hinged door; and
    said cover housing includes a black exterior coating for absorbing radiant solar energy and increasing the temperature of said cover housing in sunlight.

7. The ice fishing hole cover of claim 6, wherein said central opening including a diameter, and further wherein said diameter is less than 2.5 inches for prohibiting items to pass therethrough.

8. The ice fishing hole cover of claim 7 further comprising a design indicia.

\* \* \* \* \*